Patented Nov. 6, 1934

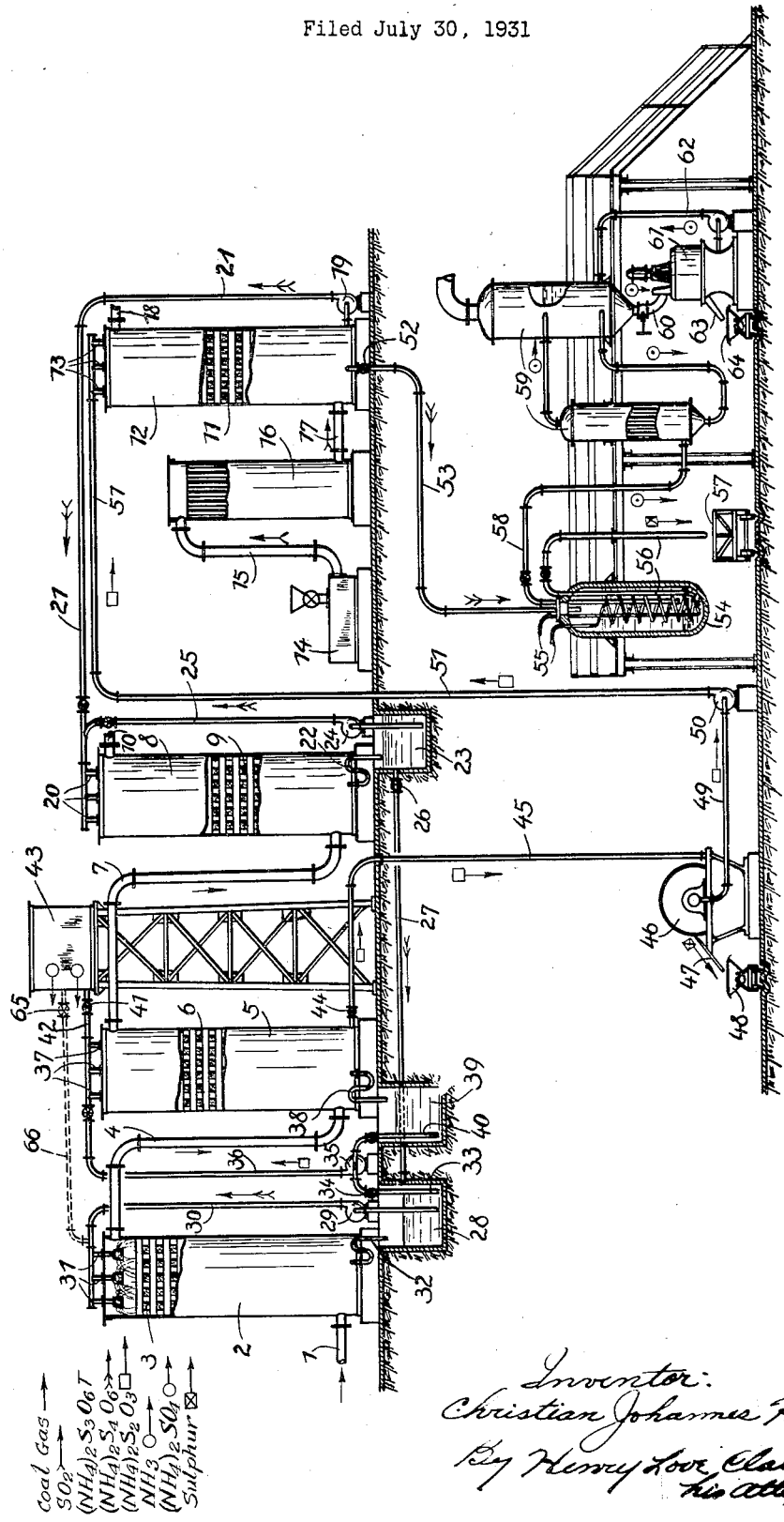

1,979,934

UNITED STATES PATENT OFFICE 1,979,934

PROCESS FOR THE REMOVAL OF AMMONIA AND HYDROGEN SULPHIDE FROM GASES

Christian Johannes Hansen, Essen-Ruhr, Germany, assignor, by mesne assignments, to The Koppers Company of Delaware, Pittsburgh, Pa., a corporation of Delaware Application July 30, 1931, Serial No. 554,146
In Germany July 31, 1930

15 Claims. (Cl. 23—225)

The invention relates to the removal of ammonia and hydrogen sulphide from gases, for instance from coal distillation gases, and more especially to the removal of ammonia and hydrogen sulphide from gases by means of aqueous solutions of ammonium thionates.

This application is a continuation in part of my copending United States application Serial No. 383,113, filed August 2, 1929, and in Germany, January 10, 1929, which United States application has since matured into Patent No. 1,889,894 of December 6, 1932.

For many years past, it has, owing to the work done by a German chemist, Walter Feld, been well known that for the purpose of removing from gases the ammonia and hydrogen sulphide, after the ammonia wholly or partly has been eliminated, the gas can be washed with a solution of ammonium polythionate, whereby a part of the hydrogen sulphide together with the ammonia still present in the gas is recovered and the removal of the remaining hydrogen sulphide from the gas can be effected in a second washing stage, during which the gas is likewise brought into contact with an ammonium polythionate solution to which the ammonia previously recovered from the gas may be passed preferably in the form of enriched ammoniacal liquor in such a proportion that an alkaline reaction of the washing fluid is maintained during the second washing of the gas. This process is in itself in so far very advantageous that by same the increased power of absorption of an alkaline polythionate solution for taking up hydrogen sulphide is fully utilized; there is, however, the disadvantage that it is not then possible, without taking any further steps, to get a gas free of ammonia seeing the polythionate solutions reacting ammoniacally show a distinct ammonia vapour tension. Special steps are consequently necessary in order to remove again from the gas the ammonia passing over from the alkaline polythionate solution and in order to make use of same during the gas purification process.

Now, the object of the invention is improvements, in the already mentioned process, for the removal of ammonia and hydrogen sulphide from the gases by means of ammonium polythionate solution by means of which it is possible to free a gas by means of said ammonium polythionates completely from hydrogen sulphide as also from ammonia.

The process according to this invention, consists in using an acid polythionate solution for the purification of the gas from ammonia and hydrogen sulphide and in bringing this solution into contact with the gas during three consecutive washing stages Nos. 1, 2, and 3, whereby the washing fluid is passed through the various washing stages in such a way that after it has been, in any desirable order, brought into contact with the gas in the initial and final washing stages, it arrives in the middle washing stage, during which the ammonia previously removed from the gas is added to the washing solution until it reaches the alkaline reaction, whereas the thionate solution supplied to the final washer, shows an acid reaction. It is preferable, that during the process, according to the invention, the solution in the final stage is so made up that this solution does not show any vapour tension of sulphur dioxide so that any passing over of sulphur dioxide in the final stage to the gas to be purified, is avoided.

The washing process is carried on, according to the process forming the object of the invention, principally as follows:

In the final stage the polythionate solution, which reacts as an acid, will remove the ammonia taken up by the gas during the middle washing stage, whereby simultaneously a part of the sulphur dioxide contained in the polythionate solution, is converted. The final washing stage is, therefore, left by a gas, completely freed from ammonia. The washing liquid goes then from the final washing stage to the initial washing stage, in which a portion of the hydrogen sulphide and possibly the entire quantity or a part of the ammonia still present in the gas is taken up. It is not possible, however, to arrive at a complete absorption of the hydrogen sulphide as the ammonia absorbed together with a portion of the hydrogen sulphide taken up, decomposed with the polythionate forming thiosulphate and thereby is rendered inactive. It is necessary, therefore, to again bring the gas into contact with an alkaline polythionate solution, which can now be effected in a middle washer, in which the alkaline reaction, necessary for the complete removal of the hydrogen sulphide is brought about by an adequate supply of concentrated ammonia water or the like.

The reactions mentioned above are shown in the following equations.

In the initial washer essentially the following reaction is effected:

$$(NH_4)_2S_3O_6 + 3H_2S = (NH_4)_2S_2O_3 + 4S + 3H_2O.$$

In the middle washer the following reaction takes place:

$$(NH_4)_2S_3O_6 + 2NH_3 + H_2S = 2(NH_4)_2S_2O_3$$

and finally the following reaction is carried out in the final washer:

$$2NH_3 + H_2O + SO_2 = (NH_4)_2SO_3.$$

Further objects of the invention are improvements in the equipment for carrying out the process according to this invention.

On the drawing there is shown a suitable apparatus for carrying out the process, according to the invention, viz. in a side-view and partly in section.

The gas to be purified, for example, a coal distillation gas, is, after it has been previously completely or partly freed from ammonia in a customary contrivance, which is not shown, led forward by the pipe line 1 to a washer 2 which, in the usual manner, is fitted inside with wooden hurdles 3. The gas rises upwards in the interior of the washer 2 and finds exit through the pipe line 4, leading to the lower end of the washer 5, which, in a similar manner to the washer 2, is provided with wooden hurdles 6. From the washer 5 the gas is then led forward through the pipe line 7 to the washer 8, provided with wooden hurdles 9 from which it is led off finally through the pipe line 10, completely freed from ammonia and hydrogen sulphide. In the washer 2, 5, and 8 the gas is brought into contact with an ammonia polythionate solution, which is produced in a washing tower 12, provided with wooden hurdles 11 out of sulphur dioxide and ammonia thiosulphate solution which is supplied from the top of the towers by means of a distributing arrangement 13. The sulphur dioxide is produced by the burning of sulphur in the sulphur burner 14, connected up by a pipe line 15 with a gas cooler 16 in which the sulphur burner gases are cooled down to about 15° C. In this connection, it may be of advantage during the cooling down of the gas to make use simultaneously also of a contrivance for removing the sulphur trioxide from the sulphur burner gases. The cooling contrivance 16 is connected up by the pipe line 17 with the lower end of the washer 12 and the sulphur gases coming forward into this washer are brought now into contact with the thiosulphate solution spraying over the hurdles 11 of the washer. In this way, the sulphur dioxide according to the following equation:

$$2(NH_4)_2S_2O_3 + 3SO_2 = (NH_4)_2S_3O_6 + (NH_4)_2S_4O_6$$

is converted into ammonium-tri- and ammonium-tetrathionate. The waste gases not absorbed escape finally from the tower 12 through the pipe line 18.

The polythionate solution formed in the tower 12 is now carried forward by means of the pump 19 through the pipe line 21 to the distributing device 20 provided at the top of the washing tower 8, by which it is distributed over the hurdles fitted in the washing tower 8. The polythionate solution flows downwards over the hurdles of the washer 8 and is so brought into contact over a large surface with the gases, rising upwards through the washing tower. At the lower end of the washing tower 8 the washing solution flows through the pipe line 22 into a dip receiver 23, from which it is sent back again into circulation by means of the pump 24 through the pipe line 25 to the sprays 20 so that the liquid in the washing tower 8 is continuously flowing down from top to bottom.

A portion of the washing fluid running into the dip receiver 23 is carried forward continuously or intermittently through the pipe line 27 controlled by a valve 26 into a second dip receiver 28, from which it is sent upwards by means of a pump 29 through the pipe line 30 to the sprayers 31 provided at the upper end of the washer 2. The washing solution reaching the foot of the washer 2 flows then through the pipe line 32 again into the dip receiver 28.

From the dip receiver 28 a portion of the washing fluid is carried forward continuously or intermittently through the pipe line 33 controlled by a valve 34 and by means of a pump 35 through the pipe line 36 to the sprayers 37 on the top of the washing tower 5. The washing fluid flows from the top of the tower 5 downwards and reaches finally through the pipe line 38 the dip receiver 39 from which it is pumped upwards by means of the pump 35 through the pipe line 40. To the washing fluid which has been carried forward to the top of the tower 5 ammonia water from an overhead tank 43 is carried forward through a pipe line 42, controlled by a valve 41 and this in such quantities that the washing fluid in the tower 5 shows a distinct alkaline reaction so that the entire hydrogen sulphide still present in the gas is absorbed by the washing fluid in tower 5.

The washing solution reaching the foot of the washing tower 5 consists essentially of ammonium thiosulphate and some ammonium polythionate. It contains also still a fairly large quantity of finely divided sulphur. A part of the washing solution is carried forward continuously or intermittently through a pipe line 45, controlled by a valve 44 to a filtering apparatus 46 in which the solid particles contained in the washing liquid are filtered off. The solid bodies filtered off go forward to the filter 46 over the chute 47 into the transport container 48. The clarified liquid flows through the pipe line 49 to a pump 50, by means of which it is impelled forward to the pipe line 51 to the tower 12 in which the ammonium thiosulphate contained in the washing liquid is reconverted as above described by means of sulphur dioxide again into ammonium polythionate.

The washing described above, can be with advantage utilized in order to recover from the spent washing fluids ammonium sulphate and sulphur. For this purpose, there is led forward intermittently a portion of the fluid passing down the washing tower 12 through the pipe line 53 controlled by the valve 52 to a pressure vessel 54 which is fitted up with a heating coil 55 for the purpose of passing through hot vapours. In the pressure vessel 54 the washing fluid is heated up under pressure to a temperature above the smelting point of sulphur, preferably to about 160–170° C., whereby the ammonia thionate is decomposed into ammonium sulphate and sulphur which latter collects in molten form at the bottom of the pressure vessel 54. After the completion of the decomposition of thionate, the sulphur is first of all drawn off by the pipe line 15

56 into the sulphur solidifying boxes 57 and thereupon the clear ammonium sulphate solution is carried forward by the pipe line 58 into a customary evaporating contrivance 59, in which the solution is evaporated to the crystallizing point of the ammonium sulphate. The ammonium sulphate produced is drawn off finally from the evaporators through the pipe line 60 into a centrifugal 61, in which the salt is freed from the mother liquor. The mother liquor flows through the pipe line 62 back again to the evaporating contrivance, whereupon the solid ammonium sulphate is carried forward over the chute 63 into the transport boxes 64.

In case the equipment, shown on the drawing, is used for the carrying out of the process, in which the gas to be purified still only contains hydrogen sulphide and the entire ammonia contents of the gas is separated out before its introduction into the washing plant by means of cooling and washing, the ammonia overhead tank 43 is connected up, as it is shown on the drawing by short lines, also with the spraying arrangement of the tower 2 by a pipe line 66, controlled by the valve 65 and to the washing fluid in the washing tower 2 during the process there is led forward so much of ammonia that, in the washing tower 1, the conversion of the ammonia and hydrogen sulphide is rendered possible, according to the equation given at the beginning.

The invention as hereinabove set forth is embodied in a particular form, but may be variously embodied within the scope of the claims hereinafter made.

I claim:

1. A process for removing from gases ammonia and hydrogen sulphide comprising the bringing into contact in one stage the gas to be treated with a solution of ammonium polythionates showing an acid reaction, bringing into contact in the second stage, the gas to be treated with a solution of ammonium polythionate, showing an alkaline reaction and bringing into contact, in a final stage, the gas to be treated with a solution of polythionates showing an acid reaction.

2. A process according to claim 1, wherein the washing liquor used in the final washing stage is transferred to the initial washing stage and used therein without previous regeneration and the washing liquor used in the initial washing stage is transferred to the middle washing stage and used therein without previous regeneration.

3. A process for removing from gases ammonia and hydrogen sulphide comprising separating from the gas to be treated ammonia, bringing into contact in one stage the gas to be treated with a solution of ammonium polythionates showing an acid reaction, bringing into contact in the second stage, the gas to be treated with a solution of ammonium polythionate, showing an alkaline reaction and bringing into contact, in a final stage, the gas to be treated with a solution of polythionates showing an acid reaction.

4. A process for removing from gases, ammonia and hydrogen sulphide comprising separating from the gas to be treated part of the ammonia, washing the gas in an initial washing stage with a solution of ammonium polythionates showing an acid reaction, washing in a middle washing stage the gas with a solution of ammonium polythionates, adding the ammonia separated out of the gas to the washing liquor for the middle washing stage to show an alkaline reaction, and washing in a final washing stage the gas with a solution of polythionates showing an acid reaction.

5. A process for removing from gases, ammonia and hydrogen sulphide comprising separating from the gas to be treated all the ammonia contained therein, washing the gas in an initial washing stage with a solution of ammonium polythionates showing an acid reaction and adding part of the ammonia separated previously from the gas to said solution for said washing, washing in a middle washing stage the gas with a solution of ammonium polythionates, and adding the ammonia separated out of the gas to the washing liquor for the middle washing stage to show an alkaline reaction, and washing in a final washing stage the gas with a solution of polythionates showing an acid reaction.

6. A process for removing from gases ammonia and hydrogen sulphide comprising separating from the gas to be treated all the ammonia contained therein, washing the gas in an initial washing stage with a solution of ammonium polythionates showing an acid reaction and adding thereto for the washing such a quantity of the ammonia separated previously out of the gas as is necessary for the simultaneous absorption of hydrogen sulphide and ammonia in the ratio of one molecule hydrogen sulphide to two molecules ammonia by the ammonium polythionates, washing in a middle washing stage the gas with a solution of ammonium polythionates adding the ammonia separated out of the gas to the washing liquor for the middle washing stage to show an alkaline reaction, and washing in a final washing stage the gas with a solution of polythionates showing an acid reaction.

7. A process as set forth in the preceding claim 4, wherein the ammonia is added to the washing liquors in the form of concentrated ammoniacal liquor.

8. A process according to claim 4 and which includes the step of treating the spent washing liquor from the middle washing stage with sulphur dioxide in such a quantity that the treated liquor shows an acid reaction.

9. A process as set forth in claim 4 wherein the washing liquor used in the final washing stage shows an acid reaction, but no sulphur dioxide vapour tension.

10. A process as set forth in claim 4, which includes the steps of treating part of the spent washing liquors with sulphur dioxide and then heating such part under pressure, and freeing the liquor thus resulting from sulphur and finally evaporating until ammonium sulphate crystalizes.

11. A process for removing from gases ammonia and hydrogen sulphide comprising: forming a solution of ammonium polythionate from sulphur dioxide and thiosulphate; washing the aforesaid gas in a series of stages comprising a subsequent stage in which the gas is washed with the aforesaid solution, an earlier stage in which the gas is washed with the spent solution from said subsequent stage to form thiosulphate, and an intermediate stage in which the gas is washed with the spent solution of said earlier stage and ammonia added thereto for effecting the washing in the intermediate stage so as to form thiosulphate therefrom.

12. A process for removing from gases ammonia and hydrogen sulphide comprising; forming a solution of ammonium polythionate from sulphur dioxide and thiosulphate; washing the aforesaid gas in a series of stages comprising a subsequent stage in which the gas is washed with the aforesaid solution, an earlier stage in which the gas is washed with the spent solution from said subsequent stage to form thiosulphate, and an intermediate stage in which the gas is washed with the spent solution of said earlier stage and ammonia added thereto for effecting the washing in the intermediate stage so as to form thiosulphate therefrom; and effecting the aforesaid formation of thionate with the spent thiosulphate solution from said intermediate stage.

13. A process for removing from gases ammonia and hydrogen sulphide comprising: forming a solution of ammonium polythionate from sulphur dioxide and thiosulphate; washing the aforesaid gas in a series of stages comprising a subsequent stage in which the gas is washed with the aforesaid solution, an earlier stage in which the gas is washed with the spent solution from said subsequent stage to form thiosulphate, and an intermediate stage in which the gas is washed with the spent solution of said earlier stage and ammonia added thereto for effecting the washing in the intermediate stage so as to form thiosulphate therefrom; effecting the aforesaid formation of thionate with the spent thiosulphate solution from said intermediate stage; treating a part of the thionate so formed to recover ammonium sulphate and free sulphur therefrom, and returning the other part thereof to the aforesaid subsequent stage and effecting the aforesaid washing of gas in the subsequent stage therewith.

14. A process for removing from gases ammonia and hydrogen sulphide comprising: bringing into contact in one stage the gas to be treated with an ammonium polythionate solution showing an acid reaction; bringing into contact in an intermediate stage the gas to be treated with ammonium polythionate solution showing an alkaline reaction; bringing into contact in a subsequent stage the gas to be treated with a polythionate solution showing an acid reaction; and effecting the aforesaid thionate treatment in said one stage with the spent thionate solution as discharged from the subsequent stage.

15. A process for removing from gases ammonia and hydrogen sulphide comprising: bringing into contact in one stage the gas to be treated with an ammonium polythionate solution showing an acid reaction; bringing into contact in an intermediate stage the gas to be treated with ammonium polythionate solution showing an alkaline reaction; bringing into contact in a subsequent stage the gas to be treated with a polythionate solution showing an acid reaction; and effecting the aforesaid thionate treatment in said intermediate stage with the spent solution as discharged from said one stage together with ammonia added after such discharge.

CHRISTIAN JOHANNES HANSEN.